(12) United States Patent
Sholander et al.

(10) Patent No.: US 7,177,295 B1
(45) Date of Patent: Feb. 13, 2007

(54) WIRELESS ROUTING PROTOCOL FOR AD-HOC NETWORKS

(75) Inventors: Peter Sholander, Atlanta, GA (US); Tracey Oakes, Virginia Beach, VA (US); Paul Coccoli, Smyrna, GA (US)

(73) Assignee: Scientific Research Corporation, Atlanta, GA (US)

( * ) Notice: Subject to any disclaimer, the term of this patent is extended or adjusted under 35 U.S.C. 154(b) by 957 days.

(21) Appl. No.: 10/093,850

(22) Filed: Mar. 8, 2002

(51) Int. Cl.
*H04Q 7/24* (2006.01)
*H04L 12/28* (2006.01)
*H04J 3/22* (2006.01)

(52) U.S. Cl. ................... 370/338; 370/401; 370/466
(58) Field of Classification Search ................ None
See application file for complete search history.

(56) References Cited

U.S. PATENT DOCUMENTS

| | | | |
|---|---|---|---|
| 5,412,654 A * | 5/1995 | Perkins | 370/312 |
| 5,654,959 A | 8/1997 | Baker et al. | |
| 5,717,688 A | 2/1998 | Belanger et al. | |
| 5,873,037 A | 2/1999 | Zicker et al. | |
| 5,875,186 A | 2/1999 | Belanger et al. | |
| 5,926,101 A | 7/1999 | Dasgupta | |
| 5,974,236 A * | 10/1999 | Sherman | 709/221 |
| 5,978,364 A | 11/1999 | Melnik | |
| 5,987,011 A * | 11/1999 | Toh | 370/331 |
| 6,028,857 A * | 2/2000 | Poor | 370/351 |
| 6,044,062 A | 3/2000 | Brownrigg | |
| 6,046,978 A | 4/2000 | Melnik | |
| 6,104,712 A | 8/2000 | Robert et al. | |
| 6,115,580 A * | 9/2000 | Chuprun et al. | 455/1 |
| 6,130,881 A | 10/2000 | Stiller et al. | |
| 6,198,920 B1 | 3/2001 | Doviak et al. | |
| 6,243,581 B1 | 6/2001 | Jawanda | |
| 6,243,585 B1 | 6/2001 | Pelech et al. | |

(Continued)

OTHER PUBLICATIONS

Haas, The Zone Routing Protocol (ZRP) for Ad Hoc Networks, Aug. 1998, http://people.ece.cornell.edu/~haas/wnl/Publications/draft-zone-routing-protocol-01.txt.*
Ma, Routing high-bandwidth traffic in max-min fair share networks, ACM Digital Library, 1996.*
Narten, RFC 2461, Neighborhood Discovery for IP Version 6 (IPv6), Dec. 1998.*
Paper entitled "Experimental Comparison of Hybrid and Proactive MANET Routing Protocols," authored by Peter Sholander, Andreas Yankopolus and Paul Coccoli, presented at IEEE MILCOM 2002, Oct. 9, 2002, pp. 1-6.
"A Review of Current Routing Protocols for Ad Hoc Mobile Wireless Networks," *IEEE Personal Communications*, Apr. 1999, pp. 46-55, authored by E. Royer and C.-K. Toh.
Y. Rekher and T. Li, "A Border Gateway Protocol 4 (BGP-4)", http://www.ietf.org/rfc/rfc1771.text?number=1771, Mar. 1995, pp. 1-50.

(Continued)

*Primary Examiner*—Ricky Q. Ngo
*Assistant Examiner*—Warner Wong
(74) *Attorney, Agent, or Firm*—Brenda O. Holmes; Kilpatrick Stockton LLP

(57) ABSTRACT

Method for selecting a route within a wireless ad-hoc routing protocol using a QoS metric. The method begins by dynamically defining a routing zone that encompasses at least two of the network nodes. A communications link is established between the source node and a destination node. If the destination node is within the routing zone of the source node, the route is determined by a proactive routing protocol. If, however, the destination node is outside the routing zone, the route is determined using a reactive routing protocol. A QoS metric for each route is calculated by combining the individual QoS metrics for each hop within the particular route. Finally, the route with the best QoS metric is selected to use as the communications link between the source node and the destination node.

29 Claims, 15 Drawing Sheets

U.S. PATENT DOCUMENTS

| | | |
|---|---|---|
| 6,249,516 B1 | 6/2001 | Brownrigg et al. |
| 6,304,556 B1 * | 10/2001 | Haas ........................ 370/254 |
| 6,594,305 B1 * | 7/2003 | Roeck et al. ............. 375/222 |
| 6,894,985 B2 * | 5/2005 | Billhartz ................... 370/252 |
| 6,954,435 B2 * | 10/2005 | Billhartz et al. .......... 370/252 |
| 2001/0039623 A1 * | 11/2001 | Ishikawa .................. 713/201 |
| 2002/0013856 A1 * | 1/2002 | Garcia-Luna-Aceves et al. ........................ 709/238 |
| 2005/0053094 A1 * | 3/2005 | Cain et al. ................ 370/469 |

OTHER PUBLICATIONS

Paper entitled "IP Quality of Service in Mobile Ad-Hoc Wireless Networks," authored by Dr. Todd Marek and Dr. 'Peter Sholander, presented at AIE Communications 21 Conference, Mar. 9, 2001, pp. 1-14.

* cited by examiner

| 0 | | 3 | 7 | | 15 | | | | | 23...... | | | ...31 |
|---|---|---|---|---|---|---|---|---|---|---|---|---|---|
| Version | | Header Length | Packet Type | | | Total Packet Length | | | | | | | |
| Total Hops in Hops List | | | TTL | | 0 | 0 | 0 | 0 | 0 | D | C | N | Reserved |
| Route Request Identifier | | | | | | Reserved | | | | | | | |
| Target IP Address | | | | | | | | | | | | | |
| Source IP Address | | | | | | | | | | | | | |
| QoS Type | | | 0 | 0 | 0 | 0 | 0 | 0 | C | D | QoS Metric Value | | |
| ... | | | | | | | | | | | | | |
| To IP Address for Hop 1 | | | | | | | | | | | | | |
| From IP Address for Hop 1 | | | | | | | | | | | | | |
| To IP Address for Hop 2 | | | | | | | | | | | | | |
| From IP Address for Hop 2 | | | | | | | | | | | | | |
| ... | | | | | | | | | | | | | |

FIG. 6

| 0 | | 3 | 7 | | 15 | | | | | 23 | | | 31 |
|---|---|---|---|---|---|---|---|---|---|---|---|---|---|
| Version | | Header Length | Packet Type | | | Total Packet Length | | | | | | | |
| Total Hops in Hops List | | | TTL | | 0 | 0 | 0 | 0 | 0 | D | C | N | Reserved |
| Route Request Identifier | | | | | | Reserved | | | | | | | |
| Target IP Address | | | | | | | | | | | | | |
| Source IP Address | | | | | | | | | | | | | |
| QoS Type | | | 0 | 0 | 0 | 0 | 0 | 0 | C | D | QoS Metric Value | | |
| ... | | | | | | | | | | | | | |
| Length of Piggyback Data | | | | | | Data Type | | | | Reserved | | | |
| IP Datagram or RRP packet | | | | | | | | | | | | | |
| To IP Address for Hop 1 | | | | | | | | | | | | | |
| From IP Address for Hop 1 | | | | | | | | | | | | | |
| To IP Address for Hop 2 | | | | | | | | | | | | | |
| From IP Address for Hop 2 | | | | | | | | | | | | | |
| ... | | | | | | | | | | | | | |

FIG. 7

| 0 | 3 | 7 | 15 | 23 | 31 |
|---|---|---|---|---|---|
| Version | Header Length | Packet Type | | Total Packet Length | |
| Total Hops in Hops List | | Hops Left in Hops List | Error Type | Reserved | |
| Error Source Address ||||||
| Error Destination Address ||||||
| Unreachable Node Address ||||||
| Route ID ||||||
| *IP Address of Hop 1* ||||||
| *IP Address of Hop 2* ||||||
| ... ||||||
| *QoS Type* | | 0 0 0 0 0 0 C D | | *QoS Metric Value* | |
| *IP Address of Salvaged Route Hop 1* ||||||
| *IP Address of Salvaged Route Hop 2* ||||||
| ... ||||||

FIG. 8

| 0 | 3 | 7 | 15 | 23 | 31 |
|---|---|---|---|---|---|
| Version | Header Length | Packet Type | | Total Packet Length | |
| Total Hops in Hops List | | Hops Left in Hops List | Reserved | | |
| Target IP Address ||||||
| Reply To IP Address ||||||
| Reply From IP Address ||||||
| *QoS Type* | | 0 0 0 0 0 0 C D | | *QoS Metric Value* | |
| ... ||||||
| IP Address of Hop 1 ||||||
| IP Address of Hop 2 ||||||
| ... ||||||

FIG. 9

| 0 | 3 | 7 | 15 | 23 | 31 |
|---|---|---|---|---|---|
| Version | Header Length | Packet Type | Total Packet Length | | |
| Total Hops in Hops List | | Hops Left in Hops List | 0 0 0 0 0 0 U R | Actual Hops | |
| Route ID | | | | | |
| QoS Type | | 0 0 0 0 0 0 C D | QoS Metric Value | | |
| ... | | | | | |
| IP Address of Hop 1 | | | | | |
| IP Address of Hop 2 | | | | | |
| ... | | | | | |
| Encapsulated IP Datagram or Route Reply | | | | | |

FIG. 10

| 0 | 3 | 7 | 15 | 23 | 31 |
|---|---|---|---|---|---|
| Version | Header Length | Packet Type | Total Packet Length | | |
| Area ID | | | | | |
| Host ID | | | | | |
| Number of Interfaces in Interface List | | Number of Hosts in Heard List | Transmitting Interface Index | Reserved | |
| Interface 1 IP Address | | | | | |
| Interface 2 IP Address | | | | | |
| ... | | | | | |
| Host Heard 1 IP Address | | | | | |
| Host Heard 2 IP Address | | | | | |
| ... | | | | | |

FIG. 11

| 0 | 3 | 7 | 15 | 23 | 31 |
|---|---|---|---|---|---|
| Version | Header Length | Packet Type | | Total Packet Length | |
| Area ID ||||||
| Link-State Packet Source Address ||||||
| Link 1 Source Address ||||||
| Link 1 Destination Address ||||||
| Link-State 1 Sequence Number ||| Link-State 1 Length |||
| Reserved ||| Zone Radius | I Q B U D S M A ||
| Link 1 Destination Subnet Mask ||||||
| Link 1 Source Address Host ID ||||||
| Link 1 Destination Address Host ID ||||||
| QoS Metric Type | 0 0 0 0 0 0 C D ||| QoS Metric Value ||
| Link 2 Source Address ||||||
| Link 2 Destination Address ||||||
| Link-State 2 Sequence Number ||| Link-State 2 Length |||
| Reserved ||| Zone Radius | I Q B U D S M A ||
| Link 2 Destination Subnet Mask ||||||
| Link 2 Source Address Host ID ||||||
| Link 2 Destination Address Host ID ||||||
| QoS Metric Type | 0 0 0 0 0 0 C D ||| QoS Metric Value ||
| ... ||||||

FIG. 12

| 0 | 3 | 7 | 15 | 23 | 31 |
|---|---|---|---|---|---|
| Version | Header Length | Packet Type | | Total Packet Length | |
| Total Hops in Hops List | | TTL | 0 0 A P Q D C N | Actual Hops | |
| Route Request Identifier | | | Reserved | | |
| Target IP Address ||||||
| Source IP Address ||||||
| *QoS Type* | | 0 0 0 0 0 0 C D | | *QoS Metric Value* | |
| ... ||||||
| *Source Latitude* ||||||
| *Source Longitude* ||||||
| *Request Zone Start Latitude* ||||||
| *Request Zone Start Longitude* ||||||
| *Request Zone Stop Latitude* ||||||
| *Request Zone Stop Longitude* ||||||
| To IP Address for Hop 1 ||||||
| From IP Address for Hop 1 ||||||
| To IP Address for Hop 2 ||||||
| From IP Address for Hop 2 ||||||
| ... ||||||

FIG. 13

| 0 | | 3 | | 7 | | 15 | | | | | | | | 23 | | 31 |
|---|---|---|---|---|---|---|---|---|---|---|---|---|---|---|---|---|
| Version | | Header Length | | Packet Type | | | | | Total Packet Length | | | | | | | |
| Total Hops in Hops List | | | | TTL | | 0 | 0 | A | P | Q | D | C | N | Actual Hops | | |
| Route Request Identifier | | | | | | | | Reserved | | | | | | | | |
| Target IP Address | | | | | | | | | | | | | | | | |
| Source IP Address | | | | | | | | | | | | | | | | |
| QoS Type | | | | 0 | 0 | 0 | 0 | 0 | 0 | C | D | QoS Metric Value | | | | |
| ... | | | | | | | | | | | | | | | | |
| Source Latitude | | | | | | | | | | | | | | | | |
| Source Longitude | | | | | | | | | | | | | | | | |
| Request Zone Start Latitude | | | | | | | | | | | | | | | | |
| Request Zone Start Longitude | | | | | | | | | | | | | | | | |
| Request Zone Stop Latitude | | | | | | | | | | | | | | | | |
| Request Zone Stop Longitude | | | | | | | | | | | | | | | | |
| Length of Piggyback Data | | | | | | | | Data Type | | | | Reserved | | | | |
| IP Datagram or RRP packet | | | | | | | | | | | | | | | | |
| To IP Address for Hop 1 | | | | | | | | | | | | | | | | |
| From IP Address for Hop 1 | | | | | | | | | | | | | | | | |
| To IP Address for Hop 2 | | | | | | | | | | | | | | | | |
| From IP Address for Hop 2 | | | | | | | | | | | | | | | | |
| ... | | | | | | | | | | | | | | | | |

FIG. 14

| 0 | 3 | 7 | 15 | 23 | 31 |
|---|---|---|---|---|---|
| Version | Header Length | Packet Type | | Total Packet Length | |
| Total Hops in Hops List | | Hops Left in Hops List | Error Type | Reserved | |
| Error Source Address ||||||
| Error Destination Address ||||||
| Unreachable Node Address ||||||
| Route ID ||||||
| *IP Address of Hop 1* ||||||
| *IP Address of Hop 2* ||||||
| ... ||||||
| *Total Hops in Sal. Route* | | *Reserved* || *Actual Hops* | |
| *QoS Type* | | 0 0 0 0 0 0 C D || *QoS Metric Value* | |
| *IP Address of Salvaged Route Hop 1* ||||||
| *IP Address of Salvaged Route Hop 2* ||||||
| ... ||||||

FIG. 15

| 0 | 3 | 7 | 15 | 23 | 31 |
|---|---|---|---|---|---|
| Version | Header Length | Packet Type | | Total Packet Length | |
| Total Hops in Hops List | | Hops Left in Hops List | 0 0 0 P Q 0 0 0 | Actual Hops | |
| Target IP Address ||||||
| Reply To IP Address ||||||
| Reply From IP Address ||||||
| *QoS Type* | | 0 0 0 0 0 0 C D || *QoS Metric Value* | |
| ... ||||||
| *Target Latitude* ||||||
| *Target Longitude* ||||||
| IP Address of Hop 1 ||||||
| IP Address of Hop 2 ||||||
| ... ||||||

FIG. 16

WIRELESS ROUTING PROTOCOL FOR AD-HOC NETWORKS

GOVERNMENT LICENSE RIGHTS

The U.S. Government has a paid-up license in this invention and the right in limited circumstances to require the patent owner to license others on reasonable terms as provided for by the terms of Contract No. F30602-00-C-0032 awarded by the U.S. Department of Defense.

TECHNICAL FIELD OF THE INVENTION

The present invention generally relates to a routing protocol for ad-hoc networks, and more particularly relates to a hybrid routing protocol that uses both proactive and reactive routing protocols to determine the best route in a wireless ad-hoc network.

BACKGROUND OF THE INVENTION

As the number of new users of distributed networks increases, there is a greater demand that network services are provided with a high level of quality of service (QoS). Moreover, the volume of multimedia traffic (i.e., voice video, image, and data) increases due to these new users and associated applications, there is an increased demand to deliver these services with an acceptable QoS. However, as the traffic over the network increases, the QoS of the network decreases. Further straining the QoS of the network is that users also want to protect their investments in their existing IP-based desktops and Local Area Networks (LANs). This currently presents a problem as traditional Internet Protocol (IP) networks provide "best-effort" service. In the public IP-based Internet, it is difficult to provide differentiated QoS for either individual applications or for different types of multimedia traffic. This lack of native QoS support often results in reduced and unacceptable levels of QoS; e.g., Voice-over-IP services with delays of several seconds, and videoconferences with jerky, low-quality video. While this level of service quality may be acceptable for individual use, it is inadequate for business and military needs.

Another trend in distributed networks, which compounds the problem, is the proliferation of wireless applications for voice, fax, paging, data, images, and video. The use of these wireless applications is expanding to true global coverage through the use of satellite networks and in-flight data communications services on commercial airlines. These wireless networks generally have lower bandwidths and higher error-rates than traditional wired networks. However, mobile users still require the same QoS for their multimedia applications, whether they're at their desktop or in a tactical environment. Needless to say, mobility and wireless operation complicate the requirement of providing an acceptable end-to-end QoS.

One type of wireless network in particular, the "ad-hoc," or Mobile Ad-Hoc Network (MANET) is particularly sensitive to these issues. MANETs are networks that may be deployed rapidly with little or no assistance and that do not have a central network structure, such as cellular-base stations or overhead satellite assets. The nodes within the MANETs are typically highly mobile and use a variety of wireless network platforms. Furthermore, nodes within the MANET may dynamically enter or leave the network. Therefore, the number of nodes and the disposition of nodes within the MANET are highly fluid and continually changing. By their nature, the MANET complicates the design and implementation of acceptable protocols to support communications between nodes within the network.

The configuration of an ad-hoc network can be either hierarchical or flat. In a hierarchical ad-hoc network, the network nodes are partitioned into groups called clusters. Within each cluster, one node is chosen to be a "cluster head." Traffic between nodes that are in different clusters always involves the cluster heads of the source and destination clusters. Depending on the number of hierarchies, the network depth can vary from a single tier to multiple tiers. Additionally, only one "type" of equipment is necessary in flat networks, as all the nodes perform the same operation and there is no "single point of failure," created by the cluster heads. Finally, the hierarchical networks require complex algorithms to maintain the tiers; e.g., creation and reconfiguration of the backbone network. The main advantage of a hierarchical ad-hoc network is the ease of the mobility management process. Cluster heads can act as databases that contain the "location" of the nodes in their own clusters. To determine the existence and the "location" of a mobile node, a query is broadcast to all the cluster heads. The appropriate cluster head then responds to the query originator. This relatively simple mobility management scheme can be mimicked in the flat networks by a routing algorithm. Finally, many network designers see hierarchical networks as matching the underlying hierarchical structure of the nodes, and their user's organization. This is especially true in military environments. However, one needs to separate the physical structure from the logical structure. Even if the underlying logical structure is indeed hierarchical, there is no reason why this logical structure cannot be implemented on top of a flat network-architecture.

In contrast, the nodes in a flat ad-hoc network are all equal. Connections are established between nodes that are in close enough proximity to one another to allow sufficient radio propagation conditions to establish connectivity. Routing between nodes is constrained by the connectivity conditions, and possibly by security limitations.

In the general case, a network may use a hybrid approach wherein a cluster-based topology is used for routing-control traffic but a flat network topology is used for the actual user-data traffic.

Ad hoc networking introduces several important difficulties for traditional routing protocols. First, determining a packet route requires that the source node know the reachability information of its neighbors. Second, the network topology may change quite often in an ad-hoc network. As the number of network nodes increases, the potential number of destinations becomes large, requiring large and frequent exchange of data (e.g., routes, routes updates, or routing tables) among the network nodes. Updates in the wireless communication environment travel over the air, and therefore consume a great deal of network resources. As the network size increases and as the nodal mobility increases, smaller and smaller fractions of this total amount of control traffic are of practical usefulness. This is due to the fact that as the nodes become more mobile, the lifetime of a link decreases, and the period in which the routing information remains valid decreases as well. It is easy to see that for any given network capacity, there exists a network size and nodal mobility for which all the network capacity is wasted on control traffic.

Existing IP routing protocols that manage wireless networks can be classified either as proactive or as reactive. Proactive protocols attempt to continuously evaluate the routes within the network, so that when a packet needs to be forwarded, the route is already known and can be used immediately. The family of Link-State protocols, such as OSPF, is one example of a proactive scheme, as is the family of Distance-Vector protocols, such as Routing Information Protocol (RIP). Reactive protocols, on the other hand, invoke a route determination procedure on demand only. Thus, when a route is needed, a global search procedure is employed. The classical flood-search algorithms are typical reactive protocols.

The advantage of the proactive protocols is that there is little delay involved in determining the appropriate route. In reactive protocols the delay to determine a route can be quite significant. Furthermore, the global search procedure of the reactive protocols requires significant control traffic. Because of this long delay and excessive control traffic, pure reactive routing protocols may not be applicable to real-time communication in MANETs. However, pure proactive schemes are also not appropriate for MANETs, as they continuously use a large portion of the network capacity to keep the routing information current. And, as mentioned above, most of this routing information is never used since ad-hoc network nodes often move quite fast.

A related issue is that of updates to the network topology database at each MANET node. For a routing protocol to be efficient, changes in the network topology must have local effect only. In other words, the creation of a new link at one end of the network is an important local event but, most probably, not a significant piece of information at the other end of the network. Proactive protocols tend to distribute such topological changes widely in the network, thereby incurring large costs. Furthermore, neither proactive nor reactive protocols employ a QoS routing.

An improvement to the protocols for ad-hoc networks uses both proactive and reactive protocols to create a hybrid routing protocol called Zone Routing Protocol (ZRP). ZRP, which is based on the notion of Routing Zones incurs very low overhead in determining a route from a source node to a destination node. The ZRP rapidly locates routes between nodes when transmission is necessary. The ZRP limits the scope of proactive routing to a local neighborhood around a particular node by defining a zone around each node in the network. The radius of the zone includes nodes whose distances from the particular node are equal to a predefined maximum number of hops. Thus, each node is only required to know the topography of the network within its zone radius. In spite of some networks being particularly large, topographical updates are only propagated locally. Therefore, route discovery in the proactive protocol is limited to only those nodes that lie within the zone radius. Additionally, the reactive protocol, which is used for inter zone connectivity, is limited to route discovery and to sending route queries to the nodes that lie at the boundary of the zone radius. In this manner, the queries hop across zone boundaries in distances of one zone radius, thereby limiting the overhead of the reactive protocol.

Although ZRP provides advantages over the proactive protocol and the reactive protocol, the ZRP has it limitations. Specifically, the ZRP does not include QoS in its route determination. When determining the route between the source node and the destination node, the ZRP will select the shortest route. That is, the ZRP will always select the route that has the fewest number of hops between the source node and the destination node. Although selecting the shortest route between nodes keeps the network overhead at a minimum, there is no consideration for the QoS of the route. There may be instances when the shortest route between nodes is not necessarily the "best" route. That is, a shorter route may sometimes be less stable than a longer route. Selecting a route that is less stable even though it may be the shortest route in the ad-hoc network can lead to delays and errors in communications between the nodes, which in most applications, such as battlefield conditions, is unacceptable.

For example, assume that the ad-hoc network is established for a military squad on a patrol mission in a battlefield environment. The source node is a squad commander and the destination node is the point man located 50 meters in front of the main squad. The shortest route between the squad commander and point man may be a single hop. However, battlefield conditions, such as intervening terrain, propagation effects, and the like, may cause the link between the squad commander and the point man to be degraded though still operational. An alternative route may exist between the company commander and the forward observer that includes an intervening node, such as a second member of the squad who is deployed on the squad's flank, in which there is a clear line-of-sight to both the squad commander and the point man. Thus, in this instance, the two-hop link between the commander and the point man will have better quality than the single-hop link. However, even though the two-hop link provides a higher quality signal than the single-hop link, the ZRP will select the single-hop link because it represents the shortest path between the commander and the point man. The ZRP protocol selects a network link based on the shortest route, regardless of whether a more robust link is available for a longer route fails to consider the QoS of the route.

Thus, there is a need in the art for a hybrid protocol that can be used with wireless ad-hoc networks that provides QoS routing within a hybrid routing protocol.

SUMMARY OF THE INVENTION

The present invention meets the need described above by providing a wireless ad-hoc routing protocol that incorporates the quality of service (QoS) as a parameter for selecting the most efficient route. Generally described, the present invention describes methods for locating a route in an ad-hoc wireless network based on the QoS of the route. The method begins by selecting an ad-hoc network that contains several network communications nodes. Next, a routing zone is dynamically defined that encompasses at least two of the network communications nodes. Due to the high mobility of the communications nodes, the routing zone may expand or contract to include more network communications nodes or fewer communications nodes. The number of nodes within the routing zone is dependent upon several variables, such as the distance between each node, environmental effects, propagation effects, and the like. For example, in a battlefield environment, the communications nodes may be armored vehicles. As the armored vehicles move across the terrain, terrain effects, such as hills intervening between the armored vehicles, may obscure the communications link, thereby temporarily removing some of the armored vehicles from the routing zone.

Once the routing zone is determined, the number of border nodes is determined within the routing zone. Border nodes are nodes at the periphery of the routing zone at which the link states of the source node terminate. Next, a communications link is established between a source node and a destination node. A source node is defined as the node where a data packet originates and a destination node is defined as the node where the data packet terminates. If the destination node is within the routing zone of the source node, the communications link is established using a route generated by the proactive routing protocol.

If, however, the destination node is outside the routing zone, the communications link may be established using the reactive routing protocol by generating a route request that is sent to each border node, which in turn broadcasts the request outside the routing zone to locate the destination node. Next, after each route between the source node and destination node has been determined, a quality of service (QoS) metric for each route is calculated by combining the individual QoS metrics for each hop within the particular route. The QoS metrics may be combined using general techniques such as additive, multiplicative, convex and concave metrics. Finally, the route with the best QoS metric is selected to use as the communications link between the source node and the destination node.

BRIEF DESCRIPTION OF THE FIGURES

FIG. 6 is an illustration of an exemplary Route Request without Piggyback Data Packet for use with the reactive route protocol of the present invention.

FIG. 7 is an illustration of an exemplary Route Request with Piggyback Data Packet for use with the reactive route protocol of the present invention.

FIG. 8 is an illustration of an exemplary Route Error Packet for use with the reactive route protocol of the present invention.

FIG. 9 is an illustration of an exemplary Route Reply packet for use with the reactive route protocol of the present invention.

FIG. 10 is an illustration of an exemplary Source Routed Data Packet for use with the reactive route protocol of the present invention.

FIG. 11 is an illustration of an exemplary NDP Hello Packet for use with the neighbor discovery protocol of the present invention.

FIG. 12 is an illustration of an exemplary PRP Link State Packet for use with the proactive route protocol of the present invention.

FIG. 13 is an illustration of an exemplary Route Request without Piggyback Data packet modified to include Location Aided Routing for use with the reactive route protocol of the present invention.

FIG. 14 is an illustration of an exemplary Route Request with Piggyback Data packet modified to include Location Aided Routing for use with the reactive route protocol of the present invention.

FIG. 15 is an illustration of an exemplary Route Error packet modified to include Location Aided Routing for use with the reactive route protocol of the present invention.

FIG. 16 is an illustration of an exemplary Route Reply packet modified to include Location Aided Routing for use with the reactive route protocol of the present invention.

FIG. 17, are logic flow diagrams illustrating an exemplary routine to calculate a route between a source node and a destination node using the hybrid routing protocol of the present invention.

DETAILED DESCRIPTION OF THE EMBODIMENTS

The present invention is embedded in a software application program that manages routing between nodes in an ad-hoc network. The software application program is known as "Wireless Ad hoc Routing Protocol" (WARP). WARP uses a hybrid protocol, with additional enhancements for Quality of Service (QoS) support. The WARP software functionality is broken up into several processes. WARP's Neighbor Discovery Protocol (NDP) locates one-hop neighbors. WARP's Proactive Routing Protocol (PRP) is a timer-based link-state routing protocol. It allows both best-effort routing based on hop-count and QoS routing based on wireless-specific routing metrics such as link-stability and a node's energy status. WARP's NDP and Reactive Routing Protocol (RRP) are separate from its PRP to allow flexibility in porting to handheld devices and microsensors. WARP's RRP uses explicit source routing that provides end-to-end QoS support in conjunction with PRP. The major difference with DSR is that WARP's RRP is a user-space application that is more portable across operating systems. The added portability comes at a slight cost, which is the added overhead associated with extra User Defined Protocol (UDP) encapsulations for both data and control packets. However, the advantage of being able to quickly and easily port the WARP application program to a variety of wireless devices that have limited storage and processing capabilities, such as hand-held radios, outweighs any disadvantage in an increase in network overhead.

The WARP software provides QoS routing for mobile ad hoc wireless networks (MANETs). It combines several approaches to the unique problems posed by mobility. The WARP software uses wireless-specific routing metrics, such as link stability and node-energy status. Its zone routing framework reduces routing overhead and accelerates route finding. It uses proactive routing within a node's local zone and on-demand source routing for non-local destinations. The WARP software has well-defined interoperation with non-WARP nodes—and the software can act as an "edge router" and/or signaling proxy." The software's open architecture allows for future enhancements, such as inclusion of other MANET protocols and ports to other operating systems and hardware platforms.

References will now be made in detail to embodiments of this invention which are illustrated in the accompanying drawings. Wherever possible, the same reference numbers will be used throughout the drawings to refer to the same or like elements.

Figure 1:
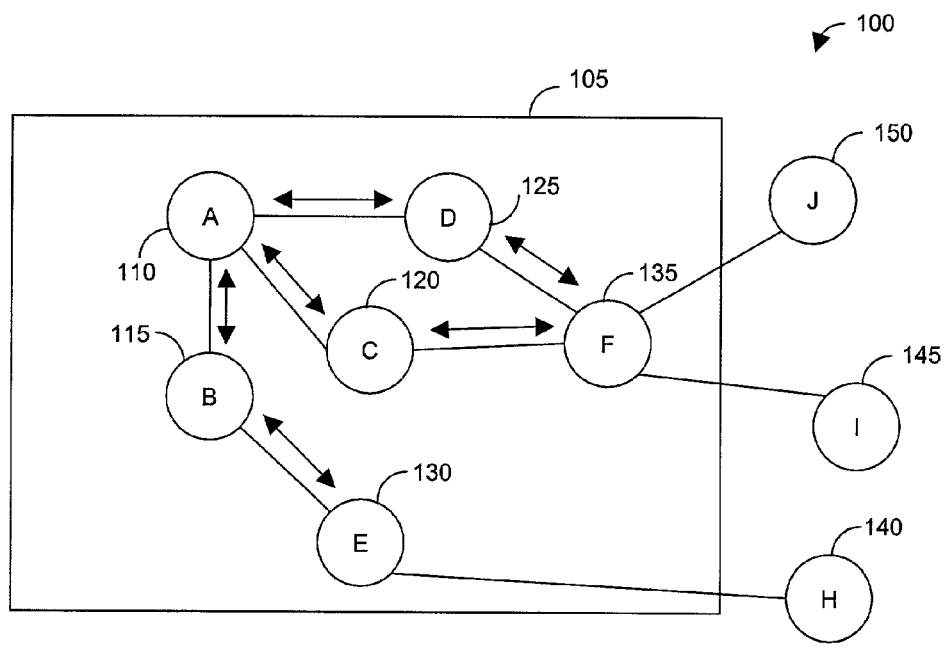
FIG. 1 is schematic illustration of a wireless ad-hoc communications network containing a number of mobile network nodes within a routing zone, which communicate with one another using a proactive routing protocol in accordance with the present invention.

FIG. 1 is an illustration of mobile an ad-hoc network (MANET) 100, which includes a number of nodes identified as Node A 110, Node B 115, Node C 120, Node D 125, Node E 130, Node F 135, Node H 140, Node I 145, and Node J 150. The MANET 100 has a routing zone 105 that is defined by the operational constraints of the network for Node A 110. The routing zone 105, therefore, is dynamic and can change as nodes are added to or removed from the network or can be set by a predetermined number of hops from the source node. The simplest definition of the routing zone 105 is a circular zone, wherein each node's zone contains the nodes whose minimum distance, in hops, is at most equal to a predefined zone radius. However, in practice, most routing zones 105 are non-circular and can be any shape such as a square, a rectangle, or any other polygonal shape. In DoD applications they may correspond to tactically-relevant formations such as squads.

In the example of FIG. 1, Node A 110 is a source node and the routing zone 105 is shown as being defined by nodes that are within two hops from Node A 110. The routes between the nodes that lie within the routing zone 105 are determined using a proactive routing protocol. The initial size and configuration of the routing zone 105 is typically established during the configuration of the node.

For example, for Node A 110, the routing zone 105 is defined as the set of nodes with which Node A 110 exchanges routing information using a proactive routing protocol which includes Node B 115, Node C 120, Node D, 125, Node E, 130, and Node F 135. Node A 110 exchanges Hello Packets using the Neighbor Discovery Protocol with its one-hop neighbors and Links State Packets using the Proactive Route Protocol with each node within the routing zone. By exchanging Hello packets and Link State Packets, the number of hops, also known as a hop count, and Quality of Service (QoS) metrics between each node within the routing zone can be determined.

The PRP is an interior gateway protocol that is based on the Link State family of protocols. The Link State (Shortest Path First) Routing is based on the notion that each node has complete network topology information. The exchange of routing information between the nodes contains the status of connections to its neighboring gateways (gateways that can be reached directly, without going through another gateway). Each node exchanges the routing information with all the other nodes within the routing zone. The status of the connections with a neighbor is determined through the use of periodic exchanges of PRP packets. Most often a "k-out-of-n" rule is used to decide upon the "liveness" of a connection between two nodes. (For example, an adjacent node may be considered down if it fails to respond to k out of n PRP packets). Typically, the PRP packets are transmitted every 5–10 seconds to obtain updated information about the links between each node in a mobile network. Those skilled in the art will appreciate that the time between transmissions of PRP packets may be set for a time shorter than 5 seconds or a time greater than 10 seconds depending on the constraints of the network environment.

In addition to the hop count, a QoS metric for each hop is also obtained from the Link State Packet. Typically, wired networks use the hop count as the QoS metric. This is due to the fact that the fewer the number of hops between the source node and the destination node, the fewer network resources are consumed. Therefore, for a given QoS requirement, the path selection in a wired network is a major factor. However, determining the QoS within a MANET presents a greater problem than determining the QoS of a wired network for several reasons. First, the underlying link connectivity in wireless ad-hoc network is prone to sudden and rapid changes. Second, all communications occur over shared wireless-media without the benefit of a central controller. Therefore each node must make a distributed estimation of the wireless link's available bandwidth. Third, the error rate of the wireless channel may vary widely, whereas the error rate of the wired network tends to have a negligible error rate. Finally, many MANET nodes are hand-held, battery-operated devices with limited power. Therefore, many non-traditional QoS metrics, such as associativity, signal stability, error rate, power levels and location are used in addition to traditional QoS metrics such as the hop count, delay, and bandwidth of the channel. The QoS metric is selected at the time the network is configured. Alternatively, the user at the node level may select the QoS metric.

Each node within the routing zone 105 sends out the changes in the status of connections with its neighbors to all the other nodes within the routing zone 105. The other nodes, upon receipt of any changes in the topology information (e.g., connectivity and/or QoS information), re-compute the shortest path to the other nodes in the routing zone.

Figure 2:
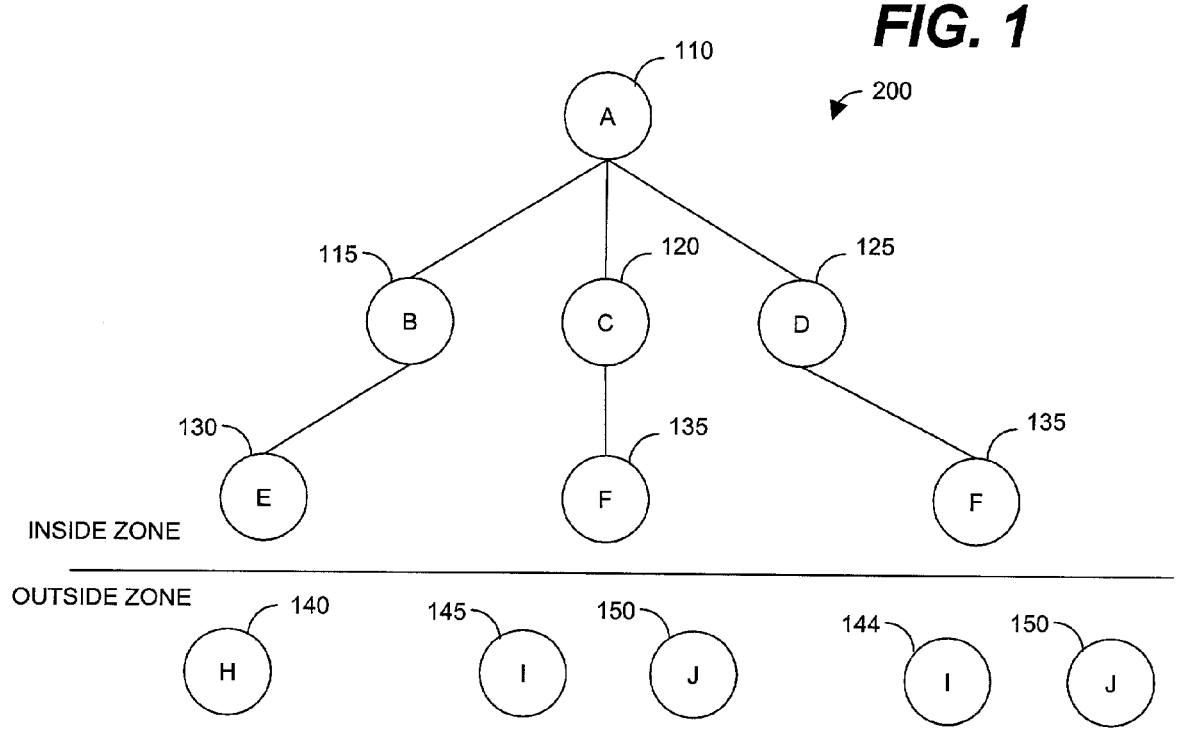
FIG. 2 is a schematic illustration of a spanning tree to determine the best route to a destination node within the routing zone in FIG. 1.

The hop count and QoS metric for each hop are then used to construct a spanning tree 200 for each node within the routing zone, which is illustrated in FIG. 2. The spanning tree provides a hop count and an overall QoS metric value for each route for a particular node. In the exemplary embodiment, the best route is then selected using a "Shortest-Widest" method. That is, the WARP software selects the route with the overall "best" QoS metric value, regardless of whether there is another route that has a smaller hop count (unless the QoS metric is hop-count). The hop-count of any alternative paths that were found is only considered if the overall QoS metric values for each route between the source and destination nodes are equal. In this case, the path having the smallest hop-count is selected as the best route so as to minimize the consumption of network resources. However, it should be apparent to those skilled in the art that a "Widest-Shortest" algorithm, which selects the shortest paths and then chooses the lowest QoS metric amongst those paths is also useful in some mobile networks and may be used without departing from the scope of the invention.

The spanning tree 200 in FIG. 2 illustrates the link states for Node A 110 of FIG. 1. Because Node A's link states do not extend beyond Node E 130 and Node F 135, these nodes are the boundary nodes of the routing zone 105. This is illustrate in the spanning tree 200 by the absence of a connection between Node E 130 Node H 140 and between Node F 135 and Node I 145 and Node J 150.

Figure 3:
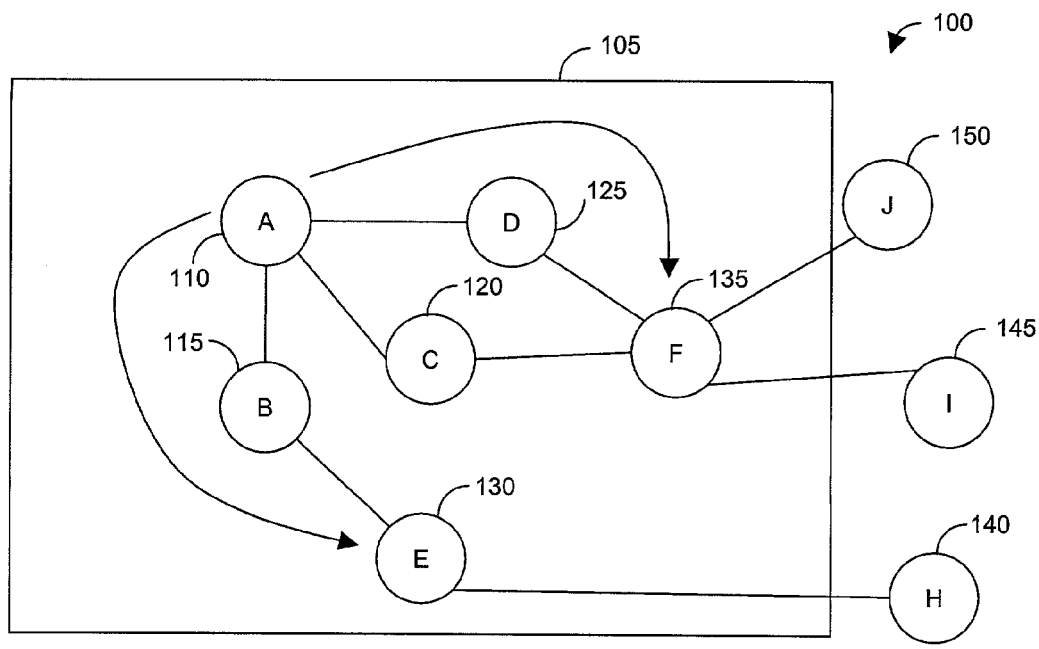
FIG. 3 is schematic illustration of a wireless ad-hoc communications network containing a number of mobile network nodes within a routing zone, which communicate with nodes outside their routing zone using a reactive routing protocol in accordance with the present invention.

FIG. 3 is an illustration of a route discovery using a hybrid protocol that includes both the proactive routing protocol and the reactive routing protocol to find the best path between Node A 110 and Node J 150, which is the destination node. The WARP software uses the following to sequence to find a route to the destination node, Node J 150. Node A 110 first checks if a route to the destination is already in its proactive spanning tree 200. If a route is not in the proactive spanning tree 200, then Node A 110 uses reactive routing protocol (RRP) to search for a route to the destination node by "intelligently" flooding a Route-Request message throughout the routing zone 105 to the border nodes, Node E 130 and Node F 135. Node A 110 also buffers the data-packet(s) until an RRP-based route is found. At this point, a bordercasting process intercepts the outgoing Route Request message and sends a copy of it from Node E 130 and Node F 135 (the border nodes). Node E 130 and Node F 135 then broadcast the Route Request to the destination node, Node J 150. The returned "source-route" is then equal to the route A-C-F-J. In this implementation, Node F 135 may receive Route Request messages via the intra-zone routes through both Nodes C 120 and Node D 125. Node F 135 may forward one, or more, of those Route Request to the destination, Node J 150. Node J 150 will then select which path to place in the Route Reply message back to the source, Node A 110. Alternately, Node F 135 may reply with a route, to Node J 150, from its Route Cache. Along with the returned source-route, an end-to-end QoS metric for the entire route is also returned. The QoS metrics are combined during the Route Request process to produce an overall QoS for each entire route.

Figure 4:
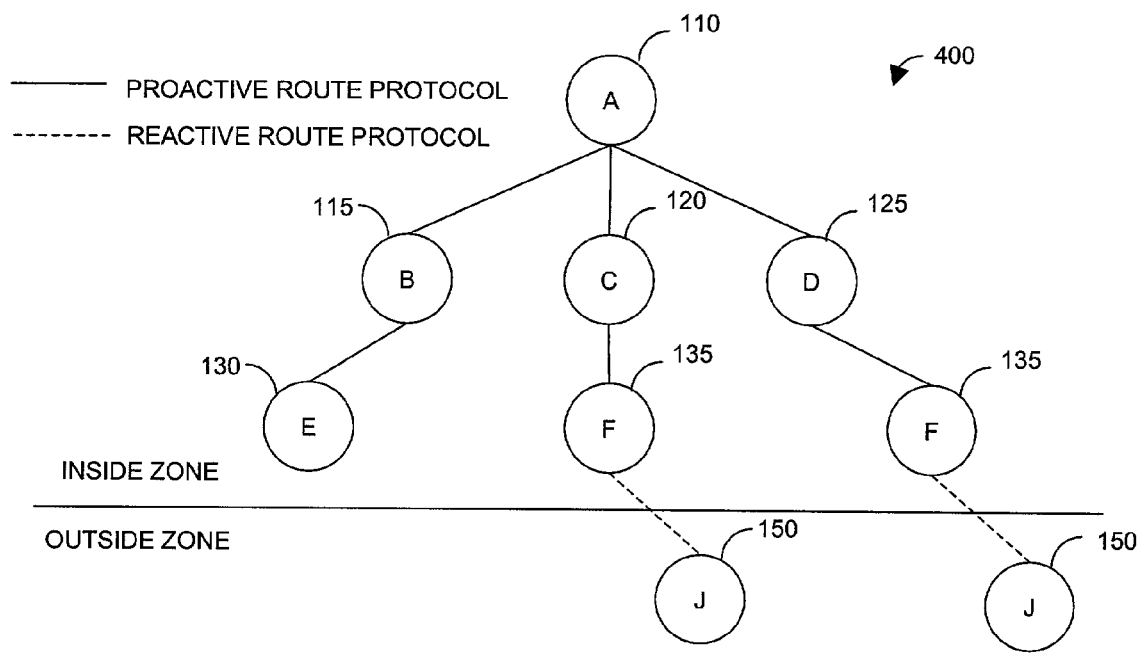
FIG. 4 is a schematic illustration of a spanning tree to determine the best route to a destination node that lies outside the routing zone in FIG. 3.

The spanning tree is then updated with the new route information. FIG. 4 illustrates the spanning tree 400 for the hybrid routing protocol for the routes A-D-F-J and A-C-F-J. The routes from the reactive routing protocol are appended to the spanning tree 200 that was developed for the proactive routing protocol. That information from the proactive routing protocol may determine whether the intra-zone path is A-D-F or A-C-F. As shown in the spanning tree 400 of FIG. 4, routes found using the proactive routing protocol are indicated with a solid line while routes found using the reactive routing protocol are shown as a dashed line. Once the spanning tree is completed, the WARP software then determines the route from Node A 110 to Node J, 150 by selecting the route that has the best overall QoS metric.

Figure 5:
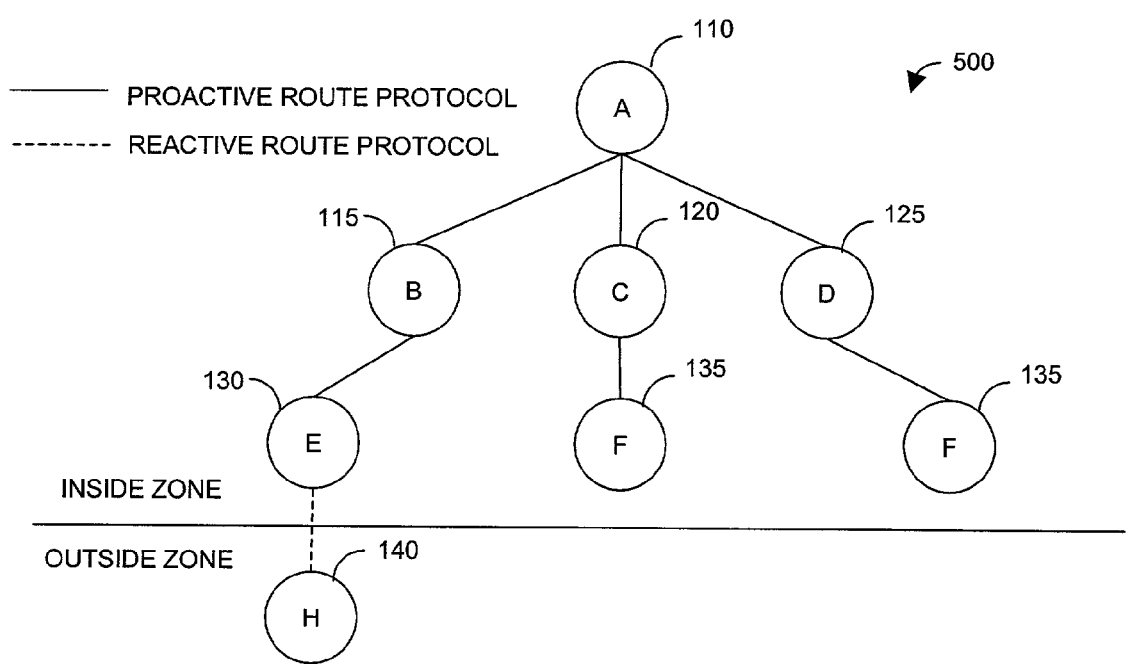
FIG. 5 is a schematic illustration of a spanning tree to determine the best route to a second destination node that lies outside the routing zone in FIG. 3.

Similarly, routes to other nodes outside the routing zone 105 may be formed. For example, if Node H 140 were the destination node, the same process for The returned "source-route" would then equal to the route A-B-E-H. FIG. 5 illustrates the spanning tree for the route A-B-E-H developed using the hybrid protocol.

FIGS. 6 through 17 are illustrations of exemplary packet formats used by the WARP architecture 100 to establish routes within the MANET. FIGS. 6 through 10 illustrate the packets used with the RRP, FIG. 11 is illustrates the packet used with the NDP protocol. FIG. 12 illustrates a packet used with the PRP protocol. FIGS. 13–17 illustrate the packets used with the RRP protocol that have been modified to include the location of the source and destination node. Although each packet is used to obtain different information, there are some elements that are common to all packets. These common elements are illustrated in Table 1.

TABLE 1

Elements common to all packets used by WARP.

| Field | Definition |
|---|---|
| Version | Version of WARP |
| Header Length | Length of the Header (including QoS tags and/or Alias Lists) (in 32 bit words) |
| Packet Type | Distinct number given to each packet type in WARP<br>1 RRP Non-QoS Route Request with or without data<br>2 RRP Route Reply<br>3 RRP Route Error<br>4 RRP Source-Routed Data<br>5 NDP Hello Packet<br>6 PRP Link-State Packets |
| Total Packet Length | Length of the Header (including QoS tags) + Length of any lists + Length of any data (in octets) |
| QoS Type | Defines QoS information carried by QoS metric value.<br>0 Best Effort (Hop-Count)<br>1 Energy-Based QoS Metric<br>2 Link Stability-Based QoS Metric |
| QoS Flags | Flags field for the QoS tag<br>D: DROP = 1 if this packet or single link-state advertisement should be silently discarded when QoS type is not recognized |

TABLE 1-continued

Elements common to all packets used by WARP.

| Field | Definition |
|---|---|
| | DROP = 0 if this QoS tag should be ignored if the QoS type is not recognized<br>C: CHANGE METRIC VALUE = 1 when intermediate nodes are permitted to change the QoS metric value during the forwarding process.<br>CHANGE METRIC VALUE = 0 when intermediate nodes are not permitted to change the QoS metric value during the forwarding process. |
| QoS Metric Value | Metric value stored in format specific to each QoS type. |

The advantage of using these packets is that they all contain several fields for a QoS metric. Although the QoS metric is well known in the art for use with wired networks, the QoS metric is not known for use with a hybrid routing protocol in a MANET to determine the most robust route between a source node and a destination mode.

FIG. 6 is an illustration of an exemplary Route Request without Piggyback Data RRP Packet. The names of the fields and their definitions contained in the Route Request without Piggyback Data are shown in Table 2.

TABLE 2

Route Request without Piggyback Data.

| Field | Definition |
|---|---|
| Total Hops in Hops List: | Number of IP Address Pairs in Hops List |
| TTL: | Time-To-Live |
| Flags: | N: NREV = 1 if replying host cannot reverse the route<br>C: CACHE = 1 if only the destination may respond<br>D: DATA = 1 if data is piggybacked on route request |
| Route Request Identifier: | A sequence number used to prevent re-flooding of request |
| Target IP Address: | Desired destination of Route Request |
| Source IP Address: | Originator of Route Request |
| To IP Address: | IP Address of interface that received the packet at the current node |
| From IP Address: | IP Address of interface that will forward the packet onward to destination |

FIG. 7 is an illustration of an exemplary Route Request with Piggybacked data. The names of the fields and their definitions contained in the Route Request with Piggyback Data are shown in Table 3. This packet allows short IP datagrams (such as TCP SYN messages) to be encapsulated within the Route Request message. This reduces the latency for TCP connection setup.

TABLE 3

Route Request with Piggyback Data

| Field | Definition |
|---|---|
| Total Hops in Hops List: | Number of IP Address Pairs in Hops List |
| TTL: | Time-To-Live |
| Flags: | N: NREV = 1 if replying host cannot reverse the route<br>C: CACHE = 1 if only the destination may respond<br>D: DATA = 1 if data is piggybacked on route request |
| Route Request Identifier: | A sequence number used to prevent re-flooding of request |
| Target IP | Desired destination of Route Request |

TABLE 3-continued

Route Request with Piggyback Data

| Field | Definition |
|---|---|
| Address: Source IP Address: | Originator of Route Request |
| Length of Piggybacked Data: | Length of Piggybacked Data contained in packet (in octets) |
| Data Type: | Indicates type of piggybacked data (1 = IP datagrams, 0 = RRP Routing Packet) |
| To IP Address: | IP Address of interface that received the packet at the current node |
| From IP Address: | IP Address of interface that will forward the packet onward to destination |

FIG. 8 is an illustration of an exemplary Route Error packet used with the RRP protocol. The fields and their definitions used by the Route Error packet are shown in Table 4.

TABLE 4

Route Error Packet for RRP.

| Field | Definition |
|---|---|
| Total Hops in Hops List: | Number of IP Address Pairs in Hops List |
| Hops Left in Hops List: | Index into list of Hops List indicating how many hops are remaining |
| Error Type: | Code given to distinguish between error conditions., such as route broken and route salvage<br>0: Route Broken<br>1: Route Salvage<br>2: Cost Exceeded |
| Error Source Address: | IP Address of node that discovered the route error |
| Error Destination Address: | IP Address of node for which the error message is intended |
| Unreachable Node Address: | IP Address of the destination address associated with the failed route |
| Route ID: | Allows Error Destination Address to remove the correct route (if more than one stored) |
| IP Address of Hop | IP Address of hops between Error Source Address and Error Destination Address, listed sequentially from source to destination |
| IP Address of Salvaged Route Hop | IP Address of hops between Error Destination Address and Unreachable Node Address, listed sequentially from Error Destination to Unreachable Node.<br>NOTE: This route is intended to replace the "broken" route referred to by the Route ID. |

FIG. 9 is an illustration of an exemplary Route Reply packet used with the RRP. The fields and their definitions used by the Route Reply packet are shown in Table 5.

TABLE 5

Route Reply packet used by RRP.

| Field | Definition |
|---|---|
| Total Hops in Hops List: | Number of IP Address Pairs in Hops List |
| Hops Left in Hops List: | Index into list of Hops List indicating how many hops are remaining. See note above. |
| Target IP Address: | IP Address of Route Request's target (i.e., node searching for) |
| Reply to IP Address: | IP Address of Route Request initiator |
| Reply from IP Address: | IP Address of Route Reply generating node |
| IP Address of Hop: | IP Address of hops between Target IP Address and Reply to IP Address, listed sequentially from source to destination |

FIG. 10 is an illustration of an exemplary Source Routed Data Packet. The fields and their definitions used by the Source Routed Data Packet are shown in Table 6.

TABLE 6

Source Routed Data Packet used with RRP.

| Field | Definition |
|---|---|
| Total Hops in Hops List: | Number of IP Address Pairs in Hops List |
| Hops Left in Hops List: | Index into list of Hops List indicating how many hops are remaining |
| Flags: | R: RRPLY = 1 if the payload is a Route Reply<br>U: UPDATE = 1 if the payload is a Route Update |
| Actual Hops: | Actual number of physical hops taken by packet |
| Route ID: | Unique identifier for <Source, Destination, Route ID> triplet |
| IP Address of Hop: | IP Address of hops between previously established source and destination, listed sequentially from source to destination |

FIG. 11 is an illustration of an exemplary Hello Packet used with the NDP. The fields and their definitions used by the NDP Hello Packet are shown in Table 7.

TABLE 7

NDP Hello Packet used with NDP

| Field | Definition |
|---|---|
| Area ID: | Cluster Identification number (currently unused) |
| Host ID: | IP Address of Transmitting Host (First IP Address of multi-homed hosts) |
| Number of Interfaces: | Number of Interfaces listed in Interface List |
| Number of Hosts: | Number of Hosts listed in Hosts Heard List |
| Transmitting Interface Index | Index into Interface List that indicates which interface this Hello packet was transmitted.<br>(0 = Interface 1 IP Address, 1 = Interface 2 IP Address, etc.) |
| Interface IP Address: | IP Address of a network interface of Host transmitting the Hello Packet. NOTE: Host ID and Interface 1 IP Address will be the same |
| Host Heard IP Address: | IP Address of a network interface that has transmitted a Hello Packet to this host since this host's last Hello Packet |

FIG. 12 is an illustration of an exemplary PRP Link State Packet. The fields and their definitions used by the NDP Hello Packet are shown in Table 8.

TABLE 8

An NDP Hello Packet

| Field | Definition |
|---|---|
| Area ID: | Cluster Identification number (currently unused) |
| LS Packet Source Address: | IP Address of node originating this Link-State Packet |
| Link Source Address: | IP Address of the node interface that generated this Link-State information |

TABLE 8-continued

An NDP Hello Packet

| Field | Definition |
|---|---|
| Link Destination Address: | IP Address of the destination node for this link |
| Link-State Sequence Number: | Sequence Number to be incremented by the link's source for each new link-state for each distinct combination of <Link Source Address, Link Destination Address> |
| Link-State Length: | Length of one link-state update (in octets) |
| Zone Radius: | Routing Zone size for source node of this link-state |
| Flags: | A: All Link State Update (ALSU) = 1 if there are more link-states pending<br>M: MASK = 1 if Link Destination Subnet Mask is included<br>S: SOURCE = 1 if Source Host ID is included<br>D: DEST = 1 if Destination Host ID is included<br>U: UP = 1 if the link is "up"<br>B: Bi-directional vs. Uni-directional (BU) = 1 if this link-state contains valid information for the link direction <link-destination to link-source><br>Q: QOS = 1 if QoS tag is included<br>I: INTERNAL = 1 if link state is for internal use only (advertise other interfaces) |
| Link Destination Subnet Mask: | Indicates the longest address prefix that the link destination can forward packets for. |
| Link Source Address Host ID: | IP Address of the first node interface that generated this Link-State information |
| Link Dest. Address Host ID: | IP Address of the destination node on first interface for this link |

FIG. 13 is an illustration of an exemplary Route Request without Piggyback Data packet used for RRP. The packet has been modified to include location aid routing (LAR), which includes the latitude and longitude of the source and destination node and a request zone which is predicted to contain the destination node. The fields and their definitions used by the Route Request without Piggyback Data packet are shown in Table 9. LAR can reduce the overhead of the RRP route-finding process because it allows the Route Request messages to be preferentially dropped or forwarded depending on the last known position of the intended destination node. In the exemplary embodiment, the request zone is rectangular in shape and its position is defined by the latitude and longitude of opposite corners of the request zone. If another shape is used to define the request zone, such as a circle, the latitude and longitude of the center point along with the radius may be used to define its position. It should be apparent to those skilled in the art the points needed to define the position of request zone will vary depending on the shape of the request zone.

TABLE 9

Route Request without Piggyback Data packet modified to include Location Aid Routing (LAR)

| Field | Description |
|---|---|
| Total Hops in Hops List: | Number of IP Address Pairs in Hops List |
| TTL: | Time-To-Live |
| Flags: | N: NREV = 1 if replying host cannot reverse the route<br>C: CACHE = 1 if only the destination may respond<br>D: DATA = 1 if data is piggybacked on route request<br>Q: QOS = 1 if a QoS tag is included in the packet<br>P: POSITION = 1 if the source node's position is included<br>A: AREA = 1 if the request area is included |
| Actual Hops: | Actual number of physical hops taken by request |
| Route Request Identifier: | A sequence number used to prevent re-flooding of request |
| Target IP Address: | Desired destination of Route Request |
| Source IP Address: | Originator of Route Request |
| Source Latitude: | Latitude of Source node at the time of the request |
| Source Longitude: | Longitude of Source node at the time of the request |
| Request Zone Start Latitude: | Latitude of one corner of the rectangular routing zone |
| Request Zone Start Longitude: | Longitude of one corner of the rectangular routing zone |
| Request Zone Stop Latitude: | Latitude of opposite corner of the rectangular routing zone |
| Request Zone Stop Longitude: | Longitude of opposite corner of the rectangular routing zone |
| To IP Address: | IP Address of interface that received the packet at the current node |
| From IP Address: | IP Address of interface that will forward the packet onward to destination |

FIG. 14 is an illustration of an exemplary embodiment of a Route Request with Piggyback Data packet used with the RRP. The fields and their definitions used by the Route Request with Piggyback Data packet are shown in Table 10.

TABLE 10

RouteRequest with Piggyback Data packet modified to include Location Aid Routing (LAR)

| Total Hops in Hops List: | Number of IP Address Pairs in Hops List |
|---|---|
| TTL: | Time-To-Live |
| Flags: | N: NREV = 1 if replying host cannot reverse the route<br>C: CACHE = 1 if only the destination may respond<br>D: DATA = 1 if data is piggybacked on route request<br>Q: QOS = 1 if a QoS tag is included in the packet<br>P: POSITION = 1 if the source node's position is included<br>A: AREA = 1 if the request area is included |
| Actual Hops: | Actual number of physical hops taken by request |
| Route Request Identifier: | A sequence number used to prevent re-flooding of request |
| Target IP Address: | Desired destination of Route Request |
| Source IP Address: | Originator of Route Request |
| Source Latitude: | Latitude of Source node at the time of the request |
| Source Longitude: | Longitude of Source node at the time of the request |
| Request Zone Start Latitude: | Latitude of one corner of the rectangular routing zone |
| Request Zone Start Longitude: | Longitude of one corner of the rectangular routing zone |
| Request Zone Stop Latitude: | Latitude of opposite corner of the rectangular routing zone |
| Request Zone Stop Longitude: | Longitude of opposite corner of the rectangular routing zone |
| Length of Piggybacked Data: | Length of Piggybacked Data contained in packet (in octets) |
| Data Type: | Indicates type of piggybacked data (1 = IP datagrams, |

TABLE 10-continued

RouteRequest with Piggyback Data packet modified to include Location Aid Routing (LAR) 0 = RRP Routing Packet)

| | |
|---|---|
| To IP Address: | IP Address of interface that received the packet at the current node |
| From IP Address: | IP Address of interface that will forward the packet onward to destination |

FIG. 15 is an illustration of an exemplary embodiment of the Route Error packet modified to include Location Aid Routing (LAR) and used with the RRP. The fields and their definitions used by the Route Error packet are shown in Table 11.

TABLE 11

Route Error packet modified to include Location Aid Routing.

| | |
|---|---|
| Total Hops in Hops List: | Number of IP Address Pairs in Hops List |
| Hops Left in Hops List: | Index into list of Hops List indicating how many hops are remaining |
| Error Type: | Code given to distinguish between error conditions, such as Route Broken Route Salvage |
| Error Source Address: | IP Address of node that discovered the route error |
| Error Destination Address: | IP Address of node for which the error message is intended |
| Unreachable Node Address: | IP Address of the destination address associated with the failed route |
| Route ID: | Allows Error Destination Address to remove the correct route (if more than one stored) |
| IP Address of Hop | IP Address of hops between Error Source Address and Error Destination Address, listed sequentially from source to destination |
| IP Address of Salvaged Route Hop | IP Address of hops between Error Destination Address and Unreachable Node Address, listed sequentially from Error Destination to Unreachable Node. NOTE: This route is intended to replace the "broken" route referred to by the Route ID. |

FIG. 16 is an illustration of an exemplary Route Reply packet that has been modified with LAR. The fields and their definitions used by the Route Reply packet are shown in Table 12.

TABLE 12

Route Reply packet modified to include LAR.

| | |
|---|---|
| Total Hops in Hops List: | Number of IP Address Pairs in Hops List |
| Hops Left in Hops List: | Index into list of Hops List indicating how many hops are remaining. See note above. |
| Flags: | Q: QOS = 1 if a QoS tag is included in the packet<br>P: POSITION = 1 if the target node's position is included |
| Actual Hops: | Actual number of physical hops taken by reply |
| Target IP Address: | IP Address of Route Request's target (i.e., node searching for) |
| Reply to IP Address: | IP Address of Route Request initiator |
| Reply from IP Address: | IP Address of Route Reply generating node |
| Target Latitude: | Latitude of target node at the time of the reply |
| Target Longitude: | Longitude of target node at the time of the reply |
| IP Address of Hop: | IP Address of hops between Target IP Address and Reply to IP Address, listed sequentially from source to destination |

Figure 17A:
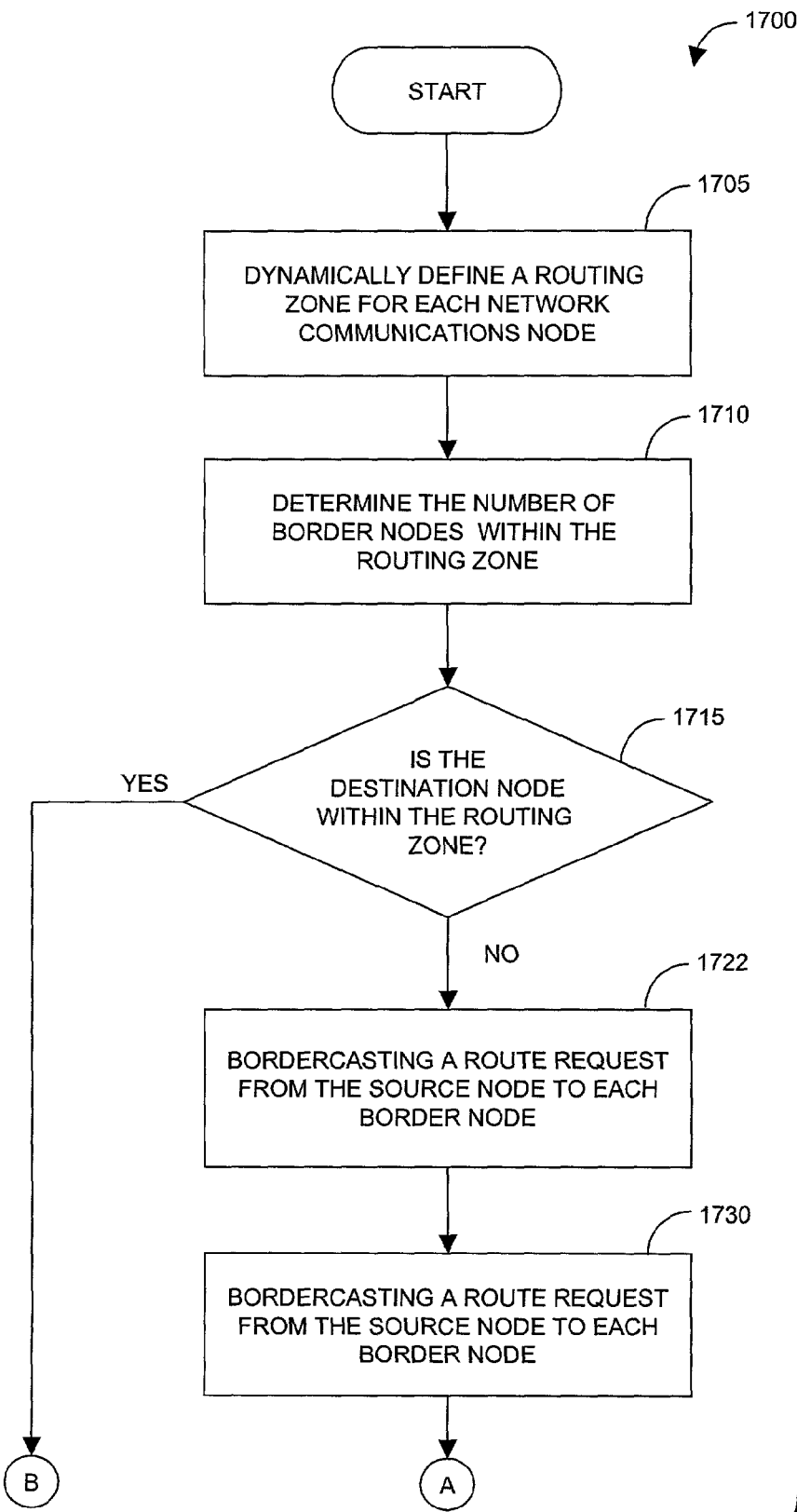
FIGS. 17A and 17B, collectively called
Figure 17B:
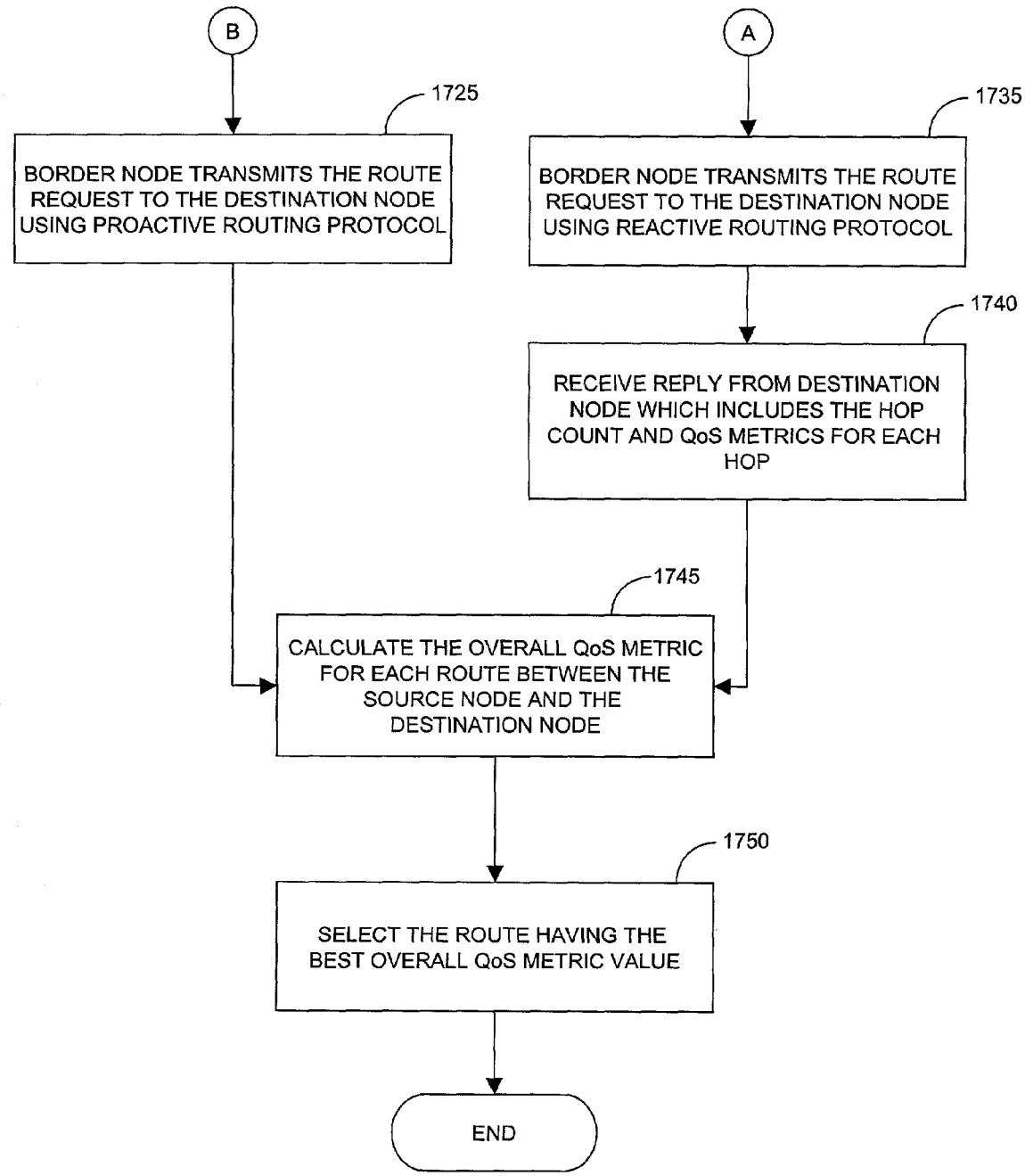

FIGS. 17A and 17B, collectively known as FIG. 17, are logic flow diagrams illustrating an exemplary method for selecting a route in an wireless ad-hoc network using the WARP software program.

Routine 1700 begins at 1705 when a routing zone 105 is defined for each node. That routing zone 105 may be either pre-configured—e.g. based on a circular zone radius or a tactically-relevant formation such as a squad of soldiers. It may also be adaptive based on network parameters such as control overhead, traffic patterns, link conditions and mobility patterns, and the like.

At 1710, the protocol determines the nodes within its routing zone 105 and the border nodes at the periphery of the routing zone 105. This allows the reactive routing protocol to determine where to forward the Route Request messages. If an incoming packet does not use a proactive routing then it uses the reactive routing protocol.

There are several ways to determine if a destination node is located within a given node's routing zone 105. One method is to determine whether a proactive route to the destination node already exists within the Operating Systems (OS's) kernel's forwarding table, which is used to create the spanning tree for the given node. If the destination node lies within the routing zone 105, then the YES branch is followed to 1725. The packet is forwarded to the destination node immediately using a proactive route that exists in the kernel's forwarding table.

If, however, the destination node does not lie within the routing zone 105, then the destination node is an "inter-zone" node, then the "NO" branch is followed to 1722, and the packet is sent to the Reactive Routing Protocol. In the exemplary embodiment, the WARP software program operates under the Linux operating system. In the Linux OS, the Reactive Routing Protocol uses the Ethertap driver contained within the 2.2 and 2.4 kernels. The Reactive Routing Protocol may also double check the destination node's intra zone status by comparing its address with those stored in a "zone node table" which is a list of the addresses of nodes located within that node's routing zone 105.

If the destination node is not an "intra-zone" node then the method proceeds from 1722 to 1735 and the RRP is used to find a route to the destination node. This occurs via intelligent forwarding of the Route Request message via a sequence of border nodes located between the requesting node and the destination node at 1735. If Route Requests reach the destination node then that node will return one, or more, of them to the requesting node at 1740.

At 1745, for both proactive and reactive routing, the protocol calculates the overall QoS metric for each path between the source node and the destination node. At 1750 at least one route is selected using the QoS to connect the source node to the destination node. Those skilled in the art will appreciate that the selection of the route may use a Shortest-Widest, a Widest-Shortest, or even some multi-metric selection technique. The selection is not fixed for the duration of a particular IP data-flow. Both the Proactive and Reactive routing components are continually monitoring the QoS of network routes. As such, the protocol may change the network routes based on changes in network topology (e.g., connectivity and QoS metrics.)

WARP Architecture

Figure 18:
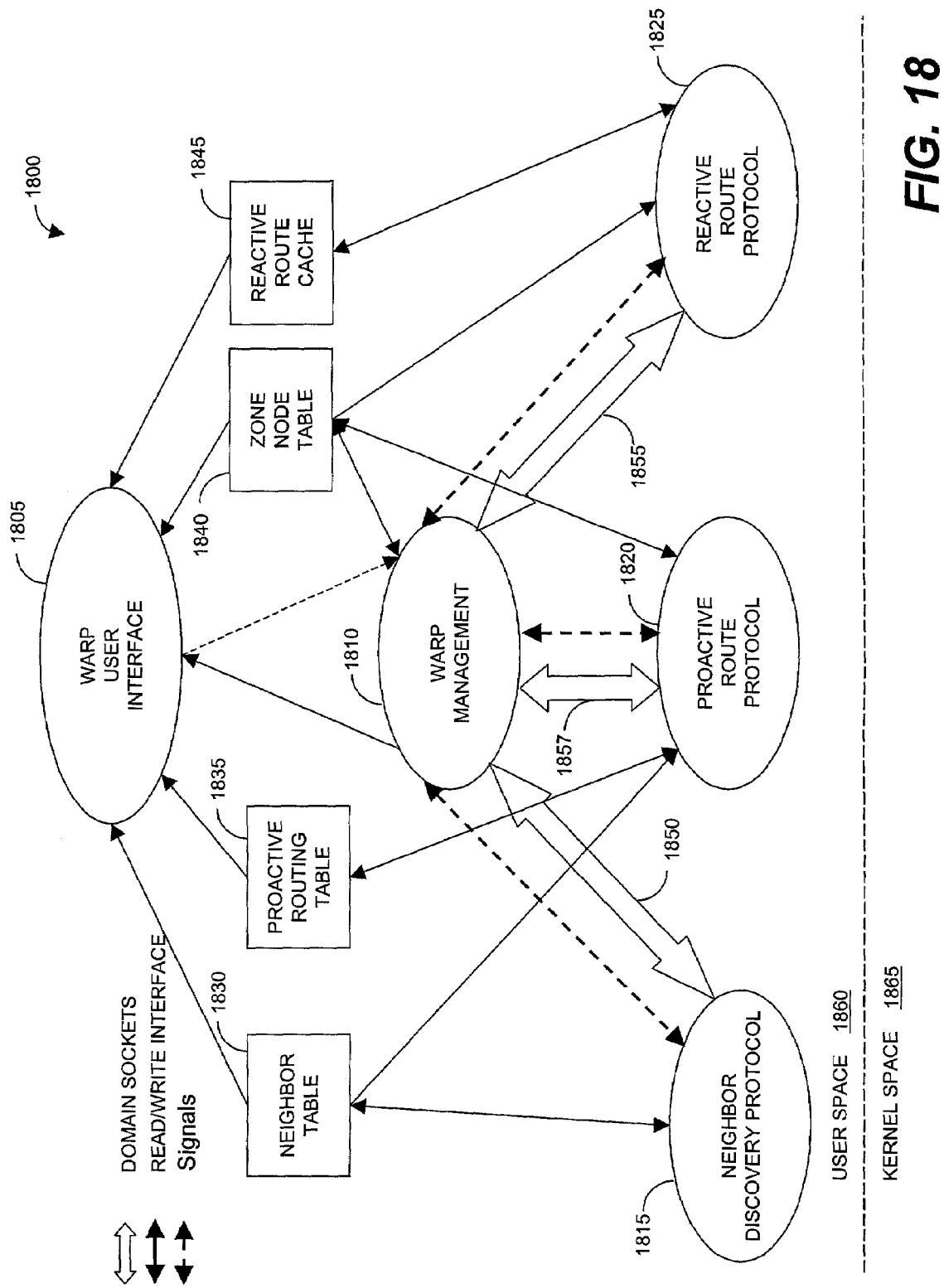
FIG. 18 is a schematic diagram illustrating an exemplary architecture for the present invention.

FIG. 18 is an illustration of the WARP software architecture 1800. The WARP software architecture 1800 contains a WARP user interface 1805, which provide user access to the underlying functional processes. The WARP interface 1805 is a command line interface (CLI), although it may be implemented as a graphical user interface (GUI) or a SNMP interface with minor modifications. From the WARP User Interface 1805, a user can view and modify configurable parameters for the WARP system. The WARP interface 1805 is connected to the WARP management process 1810, which initializes the software system parameters from a data file upon start up and initiates the WARP software functionality.

The WARP software functionality may be broken into several processes: a Neighbor Discovery Protocol (NDP) 1815, a Proactive Route Protocol (PRP) 1820, and a Reactive Route Protocol (RRP) 1825. The NDP 1815 locates the one-hop neighbors for each node within the communications network. Once the one-hop neighbors are located, their location is stored in a Neighbor Table 1830.

The PRP 1820 is a timer-based link-state routing protocol based loosely on Optimized Link State Routing (OLSR). It allows both a best-effort routing based on hop-count and a QoS routing based on wireless-specific routing metrics, such as link-stability and a node's energy status. The PRP process reads the results stored in the Neighbor Table 1830 and uses the results to create a routing zone around a designated source node. The size of the routing zone is based on predetermined parameters. For example, the size of the routing zone may be based on a predetermined zone radius that includes all nodes within two hops of the source node. Alternatively, the size of the routing zone may be based on the composition of a squad deployed on a battlefield.

Once the size of the routing zone is determined and the location of each of the nodes in the zone are known, the PRP 1820 determines the proactive routes between each node and stores the results in a Proactive Routing Table 1835. The PRP 1820 also determines the border nodes for the routing zone and writes the results to a Zone Node Table 1840. The PRP 1820 continually updates the routes within the Zone Node Table 1840 because the position and composition of the nodes within the routing zone are constantly changing. In an exemplary embodiment, the PRP 1820 updates the route table every 5 to 10 seconds. The exact time interval for updating the proactive routing table may be determined at the time the network is configured based on the environment in which the network will be operating.

The PRP 1820 may also receive updates from the NDP 1815. Each time the NDP 1815 identifies an addition of a new node, or the removal of an old node from the routing zone, it generates an update signal. The NDP 1815 sends the update signal through a domain socket 1850 to the WARP Management 1810, which in turn relays the update signal through a domain socket 1857 to the PRP 1820. The PRP 1820 then automatically updates the Proactive Routing Table 1835 based on the information from the NDP 1815.

The RRP 1825 is used for determining the route from a source node within the routing zone to a destination node that lies outside the routing zone. The RRP 1825 uses explicit source routing that provides end-to-end QoS support in conjunction with PRP 1820. The PRP 1820 sends a signal to the RRP 1825 through a domain socket 1855 via the WARP Management 1810 when it determines that the destination node lies outside the routing zone. The RRP 1825 then generates an on-demand reactive routing that "floods' a route request message to every border node within the routing zone. Simultaneously, the source node will check whether the destination node is within its routing zone. If the destination node is within the routing zone, then the path to the destination is known and no further route discovery processing is required. If, on the other hand, the destination node is not within the source's routing zone, then the source will initiate on-demand reactive routing that floods Route-Request messages throughout the network. The RRP 1825 receives a reply from the destination node and calculates the route back to the source node. The route is then stored in a Reactive Route Cache 1845.

The NDP 1815, the PRP 1820, and a RRP 1825 all lie within the user space 1860 rather than in the kernel space 1865. Moving the NDP 1815, the PRP 1820, and a RRP 1825 into the user space 1855 provides an advantage over existing MANET protocols because it allows greater flexibility in configuring the software for use in various scenarios. The NDP component 1815, the PRP component 1820, and the RRP component 1825 may be selected individually, or in any combination. To allow flexibility in porting the WARP system to small microprocessors used small electronics, such as handheld devices and microsensors.

The WARP software architecture 1800 operates on Red Hat Linux operating system without any modification to the kernel. However, the WARP software may also operate the on Power PC Linux operating system, the UNIX operating system, the Windows operating system, and the Window CE operating system. Furthermore, because the functional components of the WARP software reside in the user space 1855, WARP software may be ported to any computer operating system with few modifications.

Border Gateway Protocol

Border Gateway Protocol (BGP) is a path-vector protocol that is used for policy-based routing between different Autonomous Systems (AS). An AS is defined as a set of routers under a single technical administration that uses an interior gateway protocol, and common metrics, to route packets within the AS and an exterior gateway protocol to route packets to other AS's. BGP "speakers" exchange network-reachability information with other BGP systems that allows each AS to construct a graph of AS connectivity, from which routing loops may be pruned. Each AS makes policy decisions about the provision of transit service for other AS's. For scalability purposes, BGP supports address aggregation via classless inter-domain routing, as well as aggregation of routes (e.g., inter-AS paths). Finally, for data-plane forwarding of IP packets, BGP supports the standard Internet paradigm of hop-by-hop routing.

BGP runs over a reliable transport protocol, and requires full mesh connectivity between all of the protocol speakers within a given AS. Most implementations use TCP to satisfy this requirement. For traffic load reasons, BGP only sends changes to its current table rather than full updates on a periodic basis. In that sense, it is closer to a link-state routing protocol such as OSPF than a distance-vector protocol such as RIP.

Figure 19:
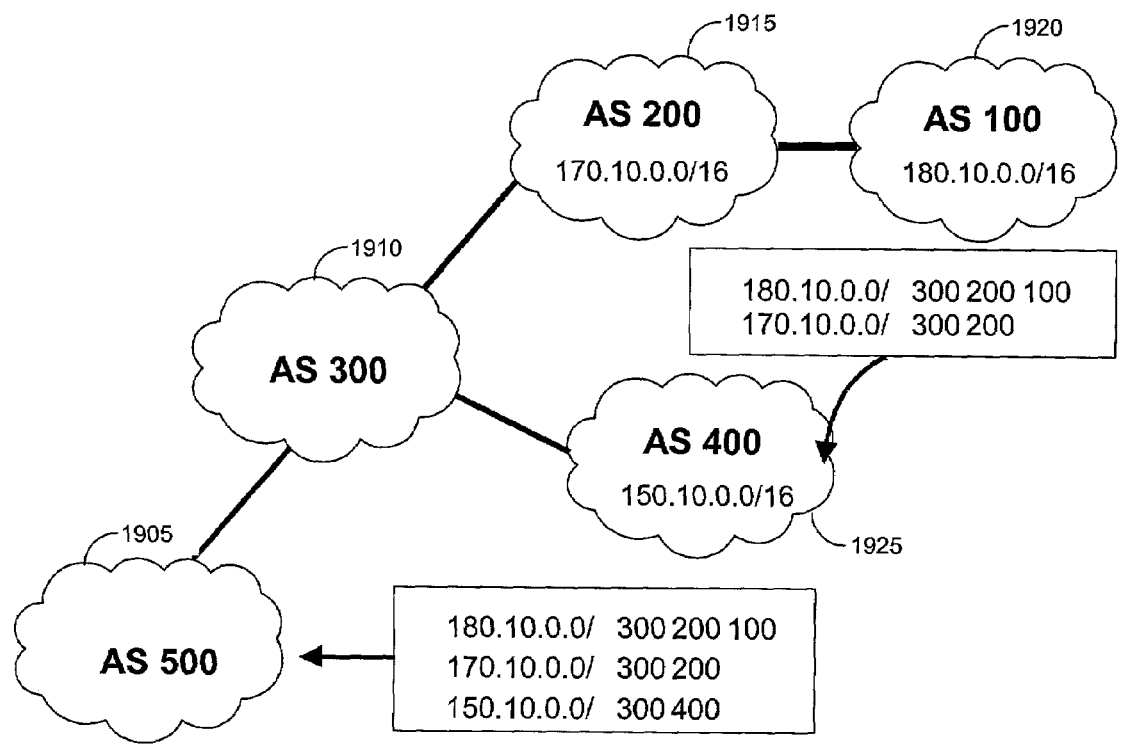
FIG. 19 is an illustration of routing between Autonomous Systems using Border Gate Protocol (BGP).

FIG. 19 illustrates a simple example of inter-domain routing. In this example, systems in AS 500 1905 learn a route to their autonomous system's "boundary router" via their interior gateway routing protocol (e.g., OSPF). The boundary router then provides egress routing to other AS's. For example the boundary router provides routing to address-blocks 180.10.0.0/16 in AS 100 1920, 170.10.0.0/16 in AS 200 1915, and 150/10.0.0/16 in AS 400 1925. When evaluating routes, a longest prefix match is typically used. The number of AS's in a path is used in the BGP path selection algorithm. However, BGP also allows the use of non-shortest-path routing, based on "peering and transit arrangements" between the various AS's. For example, a given AS may accept (or decline) transit IP traffic from another AS based solely on the business arrangements between those two AS's. However, BGP is too "heavy weight" for operation in MANET networks.

Figure 20:
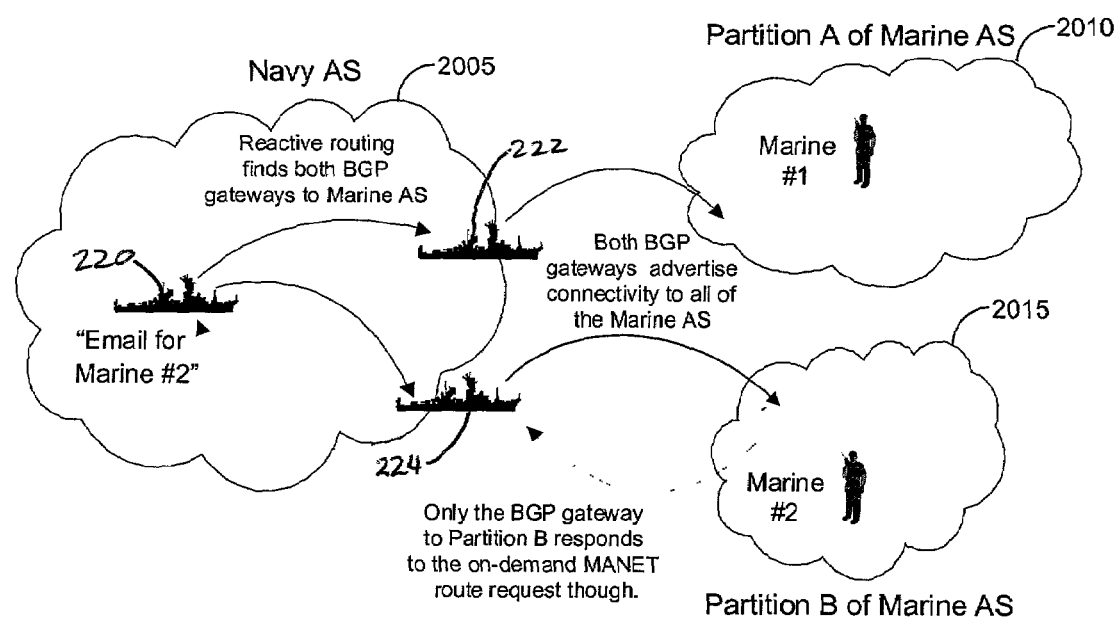
FIG. 20 is an illustration of inter-domain MANET routing within a battlefield environment.

The inter-domain gateways shown in FIG. 20 provides a lighter-weight approach to efficient routing between different MANET AS's. FIG. 20 illustrates two AS's, the Navy AS and the Marine AS. In this example, the Marines initially are located on ships 222 and 224. The Marines leave ships 222 and 224 in order to perform "Operational Maneuvers From The Sea (OMFTS)" during an opposed landing. This DoD scenario requires more complex inter-domain routing because each service branch typically configures its routers within its own separate AS. This often occurs even if the Marines' network equipment is resident on a Naval vessel.

Once the Marines land, the Marine AS becomes partitioned into Partition A and Partition B. The partitioning of an AS in a mobile environment can occur for a number of reasons, including physical distance or interference. For example, the Marines in Partition A may have moved away from the Marines in Partition B, or the Marines in Partition A may have moved to the other side of a mountain from the Marines in Partition B.

Inter-domain routing between the Navy AS 2005 and the Marine AS is straightforward if there is only a single gateway or boundary router between the two AS's and if the AS's are not partitioned. However, this may not be the case in a mobile environment. As shown in FIG. 20, the Marine AS is partitioned into Partition A and Partition B and two inter-domain gateways exist, one associated with ship 222 and one associated with ship 224. The case where one of the MANETs is a transit network (e.g., the afloat battlegroup) between the Continental United States (CONUS) backbone and an ashore network (e.g., the Marines) also works.

Reactive routing can be used to send an e-mail from a source associated with ship 220 to Marine #2. A routing request from the source is received by the inter-domain gateways on ships 222 and 224. The routing protocol used within an AS can be WARP, OSPF or any other type of routing protocol. If the AS uses WARP, then the gateway supports both WARP and BGP. The inter-domain gateway on ship 222 communicates with Partition A and the inter-domain gateway on ship 224 communicates with Partition B. Because Marine #2 is located in Partition B, only the inter-domain gateway on ship 224 replies to the routing request.

The inter-domain gateway forwards/drops the RRP Route Query threads based on the address blocks assigned to each AS or AS partition. It learns about the address blocks assigned to other AS's either via configuration (this works well for a stub AS found at a battlegroup-to-MAGTF boundary) or via a BGP protocol instance running between the adjacent gateways in adjoining AS's. Finally, once individual RRP speakers learn the IP address of their inter-domain gateway(s) they can then forward queries to other domains directly to those gateways, thereby reducing the RRP overhead load.

We claim:

1. A method for locating a route in an ad-hoc network, comprising:
   providing a network comprising a plurality of network communication nodes;
   dynamically defining a routing zone for each network communication node;
   determining a number of border nodes within the routing zone;
   if a destination node is within the routing zone, then establishing a communications link between a source node and the destination node using route information established using proactive routing protocol (PRP);
   if the destination node is outside the routing zone, then bordercasting a route request to each of the border nodes and transmitting the route request from the border nodes to the destination node using a reactive routing protocol (RRP) based on changing dynamics of the ad-hoc network;
   receiving a route reply from the destination node at one or more of the border nodes via a network layer or an application layer, the route reply comprising a hop count and a quality of service (QoS) metric for each hop count;
   using the hop count and QoS metric for each hop count in the route reply to calculate a cumulative QoS metric for each route through the one or more of the border nodes; and
   selecting at least one route from the source node to the destination node having the lowest cumulative QoS metric.

2. The method of claim 1, wherein dynamically defining the routing zone comprises:
   selecting at least one source node from the plurality of communications nodes; and
   establishing a zone radius around the source node.

3. The method of claim 2, wherein determining the border nodes comprises identifying each communication node whose minimum distance in hops from the source node is equal to the zone radius.

4. The method of claim 3, further comprising establishing a communications link between the source node and each node within the zone radius using a proactive routing protocol (PRP) by transmitting routing information from the source node to each node in the routing zone.

5. The method of claim 4, wherein the routing information is periodically transmitted at a predefined time interval.

6. The method of claim 5, wherein the predefined time interval is between 5 and 10 seconds.

7. The method of claim 4, wherein the routing information comprises:
   a hop count from the communications node to the source node; and
   a QoS metric for the route between the communications node and the source node.

8. The method of claim 1, wherein bordercasting the route request, comprises:
   transmitting the route request to each border node in the routing zone.

9. The method of claim 1, wherein calculating a cumulative QoS metric comprises:
   if the destination node is within the routing zone, then retrieving the QoS metric for the route,
   otherwise, if the destination node is outside the routing zone, then
      determining the number of communications nodes between the border node and the destination node; and
      adding the QoS metric for the route between the border node and the destination node to the QoS metric for the route between the source node and the border node.

10. The method of claim 1, wherein the QoS metric is selected from the group consisting essentially of associativity, signal stability, error rate, power levels, including battery life, hop count, delay and bandwidth.

11. The method of claim 1, wherein selecting at least one route having the lowest cumulative QoS metric comprises the "Shortest-Widest" protocol, wherein the Shortest-Widest protocol comprises:

determining a lowest cumulative QoS metric;
determining if more than one route between the source node and a destination node has the lowest cumulative QoS metric with the same value;
selecting the route having the lowest cumulative QoS metric if only one route has the lowest cumulative QoS metric; and
selecting the route having the lowest cumulative hop count between the source node and the destination node, if the more than one route has the lowest cumulative QoS metric.

12. A method of determining an efficient route between a source node and a destination node in an ad-hoc network using a hybrid routing protocol, comprising:
providing a network comprising a plurality of network communication nodes, the plurality of network communications nodes comprising at least one source node and at least one destination node;
determining at least one communications route between the source node and the destination node using the hybrid routing protocol based on changing dynamics of the ad-hoc network;
calculating a quality of service (QoS) metric for each communications route between the source node and the destination node wherein the QoS metric for each communications route is based on QoS information received via a network layer or an application layer from one or more nodes associated with the communications route; and
selecting the communications route with the best QoS metric.

13. The method of claim 12, further comprising determining a routing zone around the source node.

14. The method of claim 13, further comprising:
determining whether the destination node lies within the routing zone.

15. The method of claim 13, wherein the hybrid protocol comprises:
a proactive routing protocol (PRP) used to establish routes to destination nodes within the routing zone; and
a reactive routing protocol (RRP) used to establish routes to destination nodes outside the routing zone.

16. The method of claim 15, further comprising:
transmitting a PRP packet from the source node to each neighboring node within the routing zone periodically at a predetermined time interval;
wherein the PRP packet comprises a QoS metric for the route between that neighboring node and the source node.

17. The method of claim 16, wherein the time interval is between 5 and 10 seconds.

18. The method of claim 15, wherein using the RRP to establish routes to destination nodes outside the routing zone comprises:
sending a route request to each border node within the routing zone,
wherein each border node broadcasts the route request to every node outside the routing zone.

19. The method of claim 15, further comprising:
receiving a route reply at a first border node from the destination node; and
transmitting the route reply from the first border node to the source node,
wherein the route reply includes a quality of service (QoS) metric for each route between the destination node and the border node.

20. The method of claim 13, wherein the routing zone includes a plurality of border nodes and wherein calculating a cumulative QoS metric comprises;
if the destination node is within the routing zone, then retrieving the QoS metric for the route; and
if the destination node is outside the routing zone,
determining a number of communications nodes between a first border node and the destination node; and
adding the QoS metric for the route between the first border node and the destination node to the QoS metric for the route between the source node and the first border node.

21. The method of claim 12, wherein the QoS metric is selected from the group consisting essentially of associativity, signal stability, error rate, power levels, including battery life, hop count, delay and bandwidth.

22. A system for determining a route between a source node and a destination node within an ad-hoc network, comprising:
a neighbor discovery protocol (NDP) operable for:
locating each node within one hop of every other node;
storing the results of the location of each node within one hop of every other node as a result of the NDP in a neighbor table;
a proactive routing protocol (PRP) operable for:
reading the results stored in the neighbor table and collecting routing information about the non-neighbor nodes in the routing zone around the source node;
establishing at least one proactive route between the source node and each node within the routing zone; and
calculating a cumulative quality of service (QoS) metric for each proactive route;
determining which proactive route to each node has the lowest QoS metric; and
storing the proactive routes and associated QoS metrics for the proactive routes between the source node and each node with the lowest QoS metric in a proactive routing table; and
determining which nodes within the routing zone are border nodes;
a reactive routing protocol (RRP) operable for
establishing a reactive route between at least one of the border nodes and the destination node based on changing dynamics of the ad-hoc network, wherein the destination node is outside the routing zone;
calculating a cumulative QoS metric for each reactive route wherein the QoS metric for each reactive route is based on QoS information received via a network layer or an application layer from one or more nodes associated with the reactive route;
and
a management process operable for:
retrieving the proactive routes and associated QoS metrics from the source node to the at least one of the border nodes from the proactive routing table; and
combining the QoS metric associated with the proactive route to a selected border node with the QoS metric associated with the reactive route from the selected border node to the destination node to create a cumulative QoS metric for each route from the source node to the destination node: and
selecting the route from the source node to the destination node that has the best cumulative QoS metric.

23. The system of claim 22, wherein the PRP is further operable to:
  determine the hop count between the source node and each node within the routing zone; and
  select the route having the lowest hop count between the source node and the destination node if there is more than one proactive route between the source node and the destination node.

24. The system of claim 23, wherein the RRP is further operable to determine the hop count between each border node and the destination node outside the routing zone.

25. The system of claim 22, wherein the management process is further operable for:
  for each of the at least one border nodes:
    combining the hop count of the proactive route between the source node and the border node with the hop count of the reactive route between the border node and the destination node to create a cumulative hop count between the source node and the destination node; and
    selecting the route having the lowest hop count between the source node and destination node if there is more than one route between the source node and destination node.

26. The system of claim 25, wherein the PRP is further operable to monitor the proactive routes within the routing zone and RRP route requests and dynamically adjusting the size of the routing zone based on the proactive routes and the RRP route requests.

27. The system of claim 26, wherein the PRP is further operable for:
  monitoring the proactive routes by causing the source node to repeatedly transmit route information packets to each node within the routing zone; and
  for each node within the routing zone:
    determining a liveliness of a connection between the source node and the node by determining whether the node generates at least k replies to n route information packets, wherein k and n are predetermined values; and
    adding the node to the routing zone if the number of replies is greater than or equal to k and removing the node form the routing zone if the number of replies is less than k.

28. The system of claim 27, wherein the route information packets are transmitted periodically within a period between 5 and 10 seconds.

29. A method for locating a route in an ad-hoc network, comprising:
  dynamically defining a routing zone for a source node, wherein the routing zone includes a plurality of border zones;
  selecting a route between the source node and a destination node by:
    determining whether the destination node is within the routing zone;
    if the destination node is not within the routing zone, then bordercasting a route request to each of the border nodes requesting the border nodes transmit a route request message to the destination node using a reactive routing protocol (RRP) based on changing dynamics of the ad-hoc network;
    for at least two of the border nodes:
      receiving a route reply from the destination node, the route reply comprising a hop count and a quality of service (QoS) metric for each hop count for the route between the border node and the destination node;
      determining a route between the source node and the border node using a proactive routing protocol (PRP); and
      calculating a cumulative QoS metric for the route from the source node through the border node to the destination node wherein the QoS metric for the route is based on QoS information received via a network layer or an application layer from one or more nodes associated with the route;
    comparing the cumulative QoS metrics for the routes from the source node through at least two border nodes to the destination; and
    selecting the route having the lowest cumulative QoS metric.

* * * * *